United States Patent
Wallach

(10) Patent No.: US 11,914,756 B2
(45) Date of Patent: *Feb. 27, 2024

(54) DATA PROTECTION IN COMPUTER PROCESSORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/383,123

(22) Filed: Jul. 22, 2021

(65) Prior Publication Data
US 2021/0350030 A1  Nov. 11, 2021

Related U.S. Application Data

(63) Continuation of application No. 16/054,913, filed on Aug. 3, 2018.

(51) Int. Cl.
*G06F 21/71* (2013.01)
*G06F 9/30* (2018.01)
(Continued)

(52) U.S. Cl.
CPC .......... *G06F 21/71* (2013.01); *G06F 9/30178* (2013.01); *G06F 12/0802* (2013.01);
(Continued)

(58) Field of Classification Search
CPC .. G06F 21/71; G06F 9/30178; G06F 12/0802; G06F 12/1408; G06F 21/602;
(Continued)

(56) References Cited

U.S. PATENT DOCUMENTS 6,061,449 A  *  5/2000  Candelore .............. G06F 21/72
                                                 713/168
6,532,556 B1     3/2003  Wong et al.
(Continued)

FOREIGN PATENT DOCUMENTS

CA         2232826         12/2000
WO    2005121923 A1    12/2005

OTHER PUBLICATIONS

US 2010/0122095 A1, 05/2010, Jones et al. (withdrawn)
(Continued)

*Primary Examiner* — Mohammad W Reza
(74) *Attorney, Agent, or Firm* — Greenberg Traurig

(57) ABSTRACT

Systems, apparatuses, and methods related to a computer system having a processor and a main memory storing scrambled data are described. The processor may have a cache, a register, an execution unit, and an unscrambler. The processor can load the scrambled data into the cache; and the unscrambler may convert the scrambled data into unscrambled data just in time for the register or the execution unit during instruction execution. The unscrambled data can be an instruction, an address, or an operand of an instruction. Unscrambling can be performed just before loading the data item in a scrambled form from the cache into the register in an unscrambled form, or after the data item leaves the register in the scrambled form as input to the execution unit in the unscrambled form. The unscrambled data and the scrambled data may have the same set of bits arranged in different orders.

20 Claims, 5 Drawing Sheets

(51) Int. Cl.
   *G06F 21/60*      (2013.01)
   *G06F 12/14*      (2006.01)
   *G06F 12/0802*    (2016.01)

(52) U.S. Cl.
   CPC ........ *G06F 12/1408* (2013.01); *G06F 21/602* (2013.01); *G06F 2212/1052* (2013.01); *G06F 2212/402* (2013.01)

(58) Field of Classification Search
   CPC ....... G06F 2212/1052; G06F 2212/402; G06F 12/0875; G06F 9/3016; G06F 21/72; G06F 21/79; G06F 12/14; G06F 21/60
   See application file for complete search history.

(56) References Cited

U.S. PATENT DOCUMENTS

| | | | |
|---|---|---|---|
| 6,567,817 | B1 | 5/2003 | Vanleer |
| 10,311,229 | B1 | 6/2019 | Pohlack |
| 10,740,466 | B1 | 8/2020 | Bshara et al. |
| 11,074,198 | B2 | 7/2021 | Wallach |
| 11,113,422 | B2 | 9/2021 | Wallach |
| 2003/0110382 | A1 | 6/2003 | Leporini et al. |
| 2006/0294289 | A1* | 12/2006 | Ashmore ................ G06F 21/78 711/100 |
| 2009/0304180 | A1 | 12/2009 | Kunigk et al. |
| 2010/0106954 | A1 | 4/2010 | Muchsel et al. |
| 2010/0287622 | A1 | 11/2010 | Petkov et al. |
| 2010/0296653 | A1 | 11/2010 | Richardson |
| 2011/0185193 | A1 | 7/2011 | Grube et al. |
| 2011/0231630 | A1 | 9/2011 | Dannowski et al. |
| 2012/0002812 | A1* | 1/2012 | Bell, Jr. ................... H04L 9/06 380/42 |
| 2012/0151224 | A1 | 6/2012 | Koifman et al. |
| 2012/0297111 | A1 | 11/2012 | Hsu et al. |
| 2013/0185536 | A1 | 7/2013 | Mari et al. |
| 2013/0326236 | A1 | 12/2013 | Chheda et al. |
| 2014/0047549 | A1 | 2/2014 | Bostley, III et al. |
| 2014/0056068 | A1 | 2/2014 | Strasser et al. |
| 2015/0229471 | A1 | 8/2015 | Nair et al. |
| 2015/0234751 | A1 | 8/2015 | Van Der Sluis et al. |
| 2016/0188492 | A1 | 6/2016 | Bachwani et al. |
| 2017/0147509 | A1 | 5/2017 | Nevers et al. |
| 2017/0286421 | A1 | 10/2017 | Hayenga et al. |
| 2017/0357830 | A1 | 12/2017 | Benson et al. |
| 2017/0371809 | A1 | 12/2017 | Benedict |
| 2018/0024781 | A1 | 1/2018 | Pedersen et al. |
| 2018/0067872 | A1 | 3/2018 | Goulahsen et al. |
| 2018/0181336 | A1* | 6/2018 | Lovelace ................ G06F 21/79 |
| 2020/0042745 | A1 | 2/2020 | Wallach |
| 2020/0089625 | A1 | 3/2020 | Wallach |
| 2021/0294754 | A1 | 9/2021 | Wallach |

OTHER PUBLICATIONS

Madalin-Ioan, Neagu, et al., "Data Scrambling in Memories: A Security Measure." IEEE, 2014.
Common Scrambling Algorithm, Wikipedia, printed on Jul. 31, 2018.
Encryption, Wikipedia, printed on Sep. 11, 2018.
International Search Report, PCT/US2019/043291, dated Oct. 25, 2019.
International Search Report and Written Opinion, PCT/US2019/050613, dated Dec. 26, 2019.
Meltdown (security vulnerability), Wikipedia, printed on Sep. 11, 2018.
Scrambler, Wikipedia, printed on Jul. 31, 2018.
Side-channel attack, Wikipedia, printed on Sep. 11, 2018.
Spectre (security vulnerability), Wikipedia, printed on Sep. 11, 2018.
Extended European Search Report, EP19845010.8, dated Mar. 18, 2022.
Neagu, Madalin-Ioan. "Data Scrambling in Memories: A Security Measure." 2014 IEEE International Conference on Automation, Quality and Testing, Robotics, IEEE, May 22, 2014.
Data Protection in Computer Processors, U.S. Appl. No. 16/054,913, filed Aug. 3, 2018, Steven Wallach, Notice of Allowance Mailed—Application Received in Office of Publications, dated Nov. 27, 2020.
Key Management in Computer Processors, U.S. Appl. No. 16/134,387, filed Sep. 18, 2018, Steven Wallach, Patented Case, Dec. 24, 2020.
Key Management in Computer Processors, U.S. Appl. No. 17/341,988, filed Jun. 8, 2021, Steven Wallach, Application Dispatched from Preexam, Not Yet Docketed, Jun. 17, 2021.
Extended European Search Report, EP19861468.7, dated May 13, 2022.

* cited by examiner

DATA PROTECTION IN COMPUTER PROCESSORS

RELATED APPLICATIONS

The present application is a continuation application of U.S. patent application Ser. No. 16/054,913 filed Aug. 3, 2018 and issued as U.S. Pat. No. 11,113,422 on Sep. 7, 2021, the entire disclosure of which application is hereby incorporated herein by reference.

FIELD OF THE TECHNOLOGY

At least some embodiments disclosed herein relate generally to computer architecture and more specifically, but not limited to, data security in computer processors.

BACKGROUND

A typical computer processor receives instructions and/or data from a main memory of the computer system for processing. The instructions and/or data can be cached for the processor. In some instances, unauthorized access to the content in the main memory or the processor cache may be made. For example, multiple processors or processing cores formed on a same die can share the main memory. One processor or processing core can access the content for another processor or processing core through the shared main memory and/or a processor cache memory through memory sharing and/or a cache coherence protocol.

For example, speculative execution is a computing technique where a processor executes one or more instructions based on the speculation that such instructions need to be executed under some conditions, before the determination result is available as to whether such instructions should be executed or not. Speculative execution can lead to security vulnerabilities where unauthorized access to content can be made. Examples of security vulnerabilities in computer processors include Meltdown and Spectre that were made public in 2018.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of protecting data in a computer processor via data scrambling.

For example, a data item addressable using an address in the computer processor can be stored in a scrambled form before its use in instruction execution. The scrambled data item can be an instruction, an address, or an operand to be operated upon by an instruction. The data item can be cached in the scrambled form in an internal cache and/or an external cache; and/or the data item can be stored in the main memory in the scrambled form. Unscrambling can be performed inside the processor to recover the data item just in time for the data item to be used in the processor. When the data item is scrambled, it can be difficult or impossible to recover the data item from the scrambled form without the key. The processor unscrambles the data item using the secret key(s) to execute upon the data item. Thus, the data security in the processor is improved. Preferably, the keys or secrets for the scrambling and thus corresponding unscrambling operations are random numbers; and the scrambling/unscrambling operations do not involve computational intensive operations such as those required in asymmetric cryptography. Preferably, the keys or secrets for the scrambling/unscramble operations in the processor are not mathematical/numerical representations of entities, such as the public or private key pairs in asymmetric cryptography.

Figure 1:
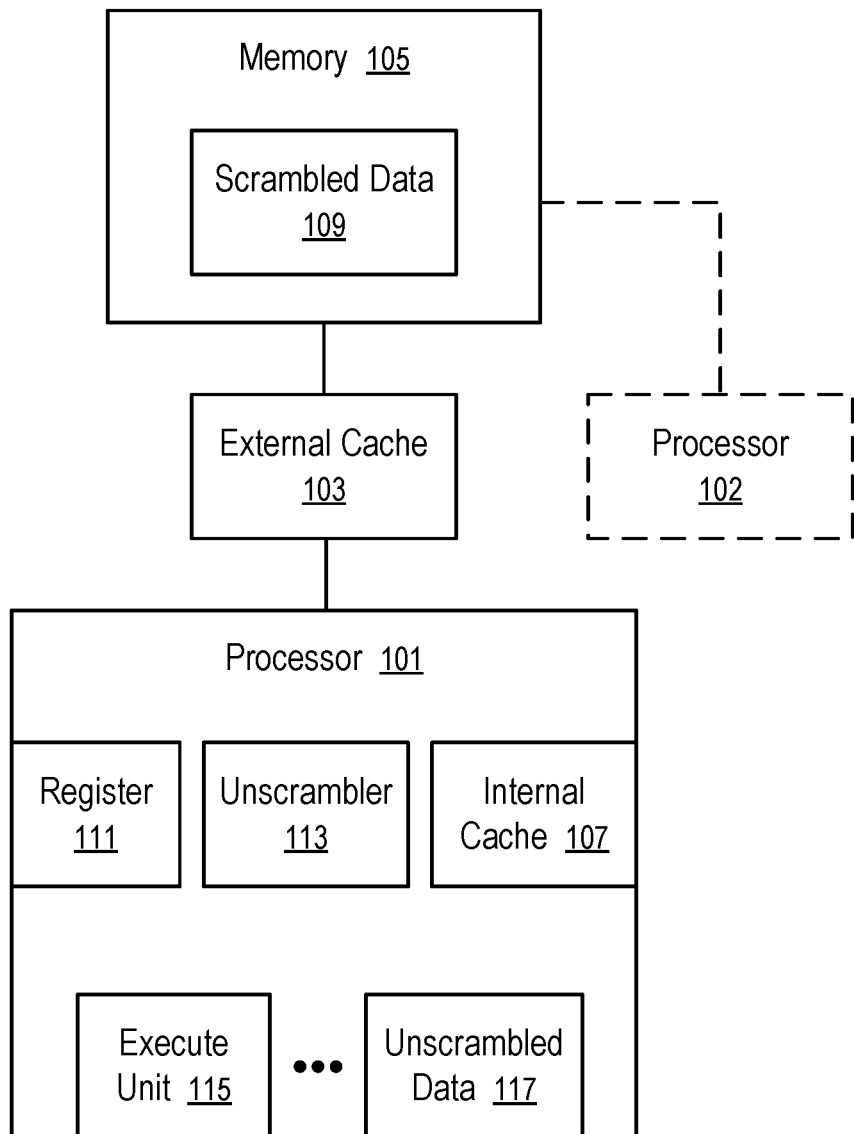
FIG. 1 shows a processor having an unscrambler according to at least some embodiments.

FIG. 1 shows a processor (101) having an unscrambler (113) according to at least some embodiments.

In FIG. 1, the processor (101) is coupled to a memory (105) that supplies instructions and data to the processor (101) for execution. The memory (105) stores scrambled data (109) that needs to be unscrambled using secret keys. In general, the memory (105) can be the main memory of the computer system, or a storage device of the computer system, or a hybrid memory and storage device. The memory (105) can include volatile memory and/or non-volatile memory.

The processor (101) may load the scrambled data (109) into an external cache (103) and/or an internal cache (107). Since the content in the external cache (103) and/or the internal cache (107) is scrambled using the secret keys, the content is protected against unauthorized access.

The unscrambler (113) is coupled between the internal cache (107) and a register (111) and/or an execution unit (115). The unscrambler (113) generates the unscrambled data (117) just in time for use in the register (111) or the execution unit (115).

For example, the scrambled data (109) can be an instruction to be executed in the processor (101). The instruction can be stored in a scrambled form in the internal cache (107), the external cache (103), and/or the memory (105). Just before the execution of the instruction, the unscrambler (113) converts it into an unscrambled form. The execution unit (115) then executes the instruction.

In some instances, the processor (101) also includes a scrambler that scrambles the result of the execution to generate a scrambled result that is subsequently stored in the internal cache (107), the external cache (103), and/or the memory (105).

In another example, the scrambled data (109) is an operand to be operated upon by an instruction in the processor (101). The item can be stored in the internal cache (107), the external cache (103), and/or the memory (105) in the scrambled form. Just before the item is loaded into the register (111) or the execution unit (115) for operations, the unscrambler (113) converts it into an unscrambled form. The execution unit (115) then uses the item in the execution of the instruction. For example, the execution unit (115) can be an arithmetic-logic unit; and the item can be an operand to be operated upon during the execution of an instruction in the arithmetic-logic unit, or the instruction itself.

Since the data item is in a scrambled form in the memory (105), the external cache (103), and the internal cache (107), another processor (102) having access to the memory (105), the external cache (103), and the internal cache (107) cannot recover the unscrambled data item without the keys or secrets for unscrambling.

Preferably, the scramble/unscramble operations are configured such that the performance impact in the processor (101) is reduced/minimized.

For example, scrambling/unscrambling can be performed by reordering the bits in a data item. The data item has a predetermined width that corresponds to the number of bits in the data item and/or the width of the register (111) of the processor (101). The operation of reordering the bits within the data item can be performed efficiently using multiplexers illustrated in FIGS. 2 and 3.

Figure 2:
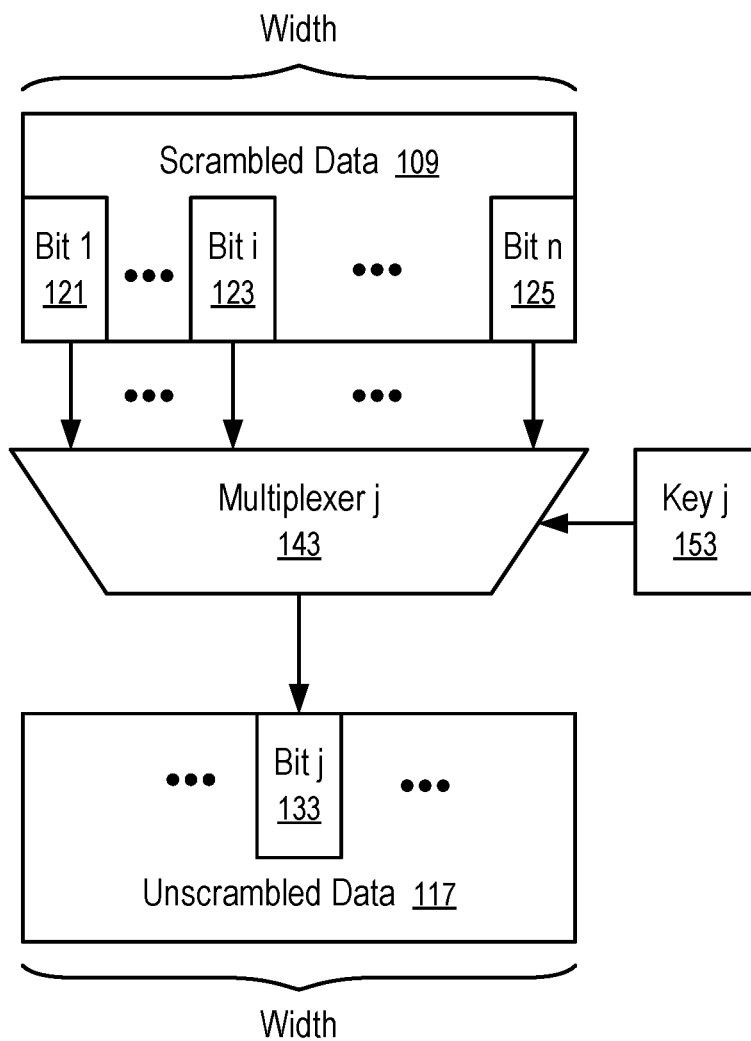
FIG. 2 shows the operations of an unscrambler for recovering a bit from scrambled data.

FIG. 2 shows the operations of an unscrambler (113) for recovering a bit (133) of unscrambled data (117) from scrambled data (109).

In FIG. 2, the bit j (133) at a particular position in the unscrambled data (117) is recovered by applying a corresponding key j (153) to a multiplexer (143). The multiplexer (143) receives then bits (121, . . . , 123, . . . , 125) of the scrambled data (109) as inputs. The key j (153) specifies which one (e.g., 123) of the input bits (121, . . . , 125) is to be selected by the multiplexer (143) as the output bit (133) at the given position j in the unscrambled data (117). The order of the bits (121, . . . , 123, . . . , 125) in the scrambled data (109) has been changed from the order of the bits in the unscrambled data (109). The key j (153) is used to select the correct bit (e.g., 123) from the scrambled data (109) as a bit at a particular position j in the unscrambled data (117). Without the secret/key j (153), the randomly scrambled ordering of the bits (121, . . . , 123, . . . , 125) in the scrambled data (109) masks the true value of the unscrambled data (117). Therefore, a direct interpretation of the scrambled data (109) is useless.

The operation of the multiplexer (143) can be implemented efficiently in the processor (101) using a logic circuit with minimum delay in the execution pipeline. No numerical or complex encryption algorithm operations (e.g., multiplication or division of integer numbers or floating-point numbers) are required to unscramble the data. Thus, an unscrambler (113) based on the operation of FIG. 2 has minimum impact on the operating performance of the processor (101).

Figure 3:
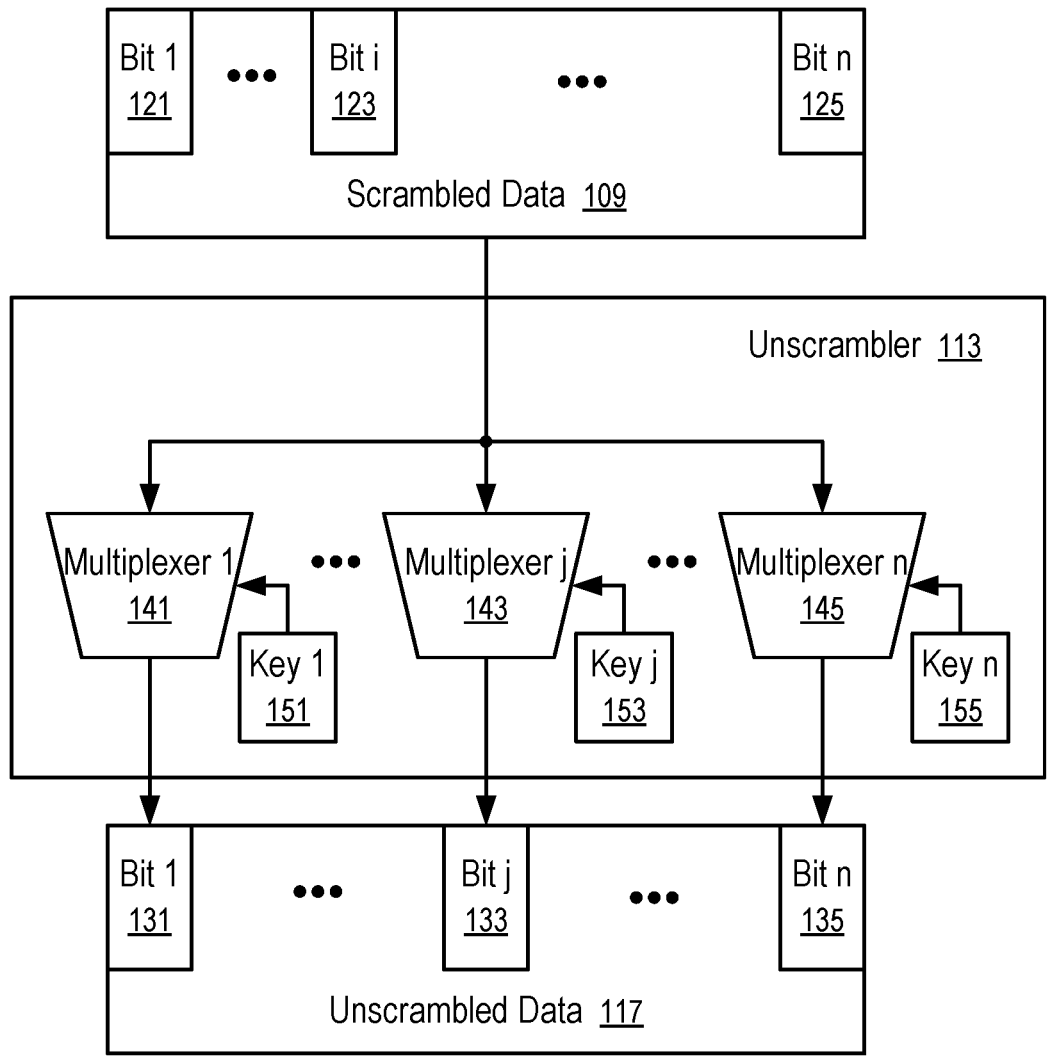
FIG. 3 illustrates an unscrambler of a processor.

FIG. 3 illustrates an unscrambler of a processor.

In FIG. 3, the scrambled data (109) and the unscrambled data (117) have the same number (n) of bits. A same number (n) of multiplexers (141, . . . , 143, . . . , 145) are used to operate on input bits (121, . . . , 123, . . . , 125) of the scrambled data (109) to output the respective output bits (131, . . . , 133, . . . , 135) of the unscrambled data (117). The multiplexers (141, . . . , 143, . . . , 145) change the order of the bits (121, . . . , 123, . . . , 125) of the scrambled data (109) to the order of the bits (131, . . . , 133, . . . , 135) of the unscrambled data (117).

Preferably, the multiplexers (141, . . . , 143, . . . , 145) are operated concurrently to minimize the delay caused by unscrambling. Alternatively, a reduced number of multiplexers can be used to reduce logic circuits used to implement the unscramble; and the reduced set of multiplexers can be used in iterations of operations to generate different subsets of output bits (131, . . . , 133, . . . , 135), such that the complete set of output bits (131, . . . , 133, . . . , 135) can be computed through the iterations.

As illustrated in FIG. 3, the scrambled data (109) and the unscrambled data (117) have the same number (n) of bits and the same values for corresponding bits. For example, bit i (123) in the scrambled data (109) corresponds to bit j (133) in the unscrambled data (117). Thus, the scrambled data (109) and the unscrambled data (117) differ from each other in their bit sequences; and the unscrambled data (117) can be considered as scrambled version of the scrambled data (109). Therefore, the set of multiplexers (141, . . . , 143, . . . , 145) of the unscrambler (113) can be used with a complementary set of keys to select the bits (131, . . . , 133, . . . , 135) of the unscrambled data (117) to generate the bits (121, . . . , 123, . . . , 125) of the scrambled data (109). For example, since unscrambling key j (153) identifies select input bit i (123) from position i of the scrambled data (109) as output bit j (133) at position j of the unscrambled data (117), a complementary scrambling key i identifies position j in the unscrambled data (117) for selection as the bit i (123) at position i in the scrambled data (109). Thus, the scrambling keys can be computed from the unscrambling keys (151, . . . , 153, . . . , 155). By applying the complementary set of scrambling keys in the unscrambler (113) to operate on the unscrambled data (117), the unscrambler (113) can function as a scrambler to generate the scrambled data (109). Similarly, the unscrambling keys (151, . . . , 153, . . . , 155) can be computed from the scrambling keys. Therefore, a scrambler can be implemented in a way as the unscrambler (113) implemented in FIG. 3; and the unscrambler (113) can be reconfigured as a scrambler (113) by loading a set of scrambling keys to replace the unscrambling keys (151, . . . , 153, . . . , 155).

As illustrated in the FIG. 3, the scramble/unscrambling operations do not change the data size (n) before and after the operations. The storage capacity requirement for the scrambled data (109) is the same as the storage capacity requirement for the unscrambled data (117). No extra memory/storage capacity is required for the scrambled data (109).

FIGS. 2 and 3 illustrate a preferred unscrambler (113). In general, other unscramblers can also be used in the processor (101).

For example, a scrambler/unscrambler can be performed by selectively inverting a bit according to the value of a corresponding bit in a key. If the corresponding bit in a key has a predetermined value (e.g., 1), the bit of the input data is inverted to generate the corresponding bit of the output data; otherwise, the bit of the output data is the same as the bit of the input data.

For example, the bit inversion operation can be combined with bit re-positioning as in FIGS. 2 and 3 for scrambling/unscrambling.

Figure 4:
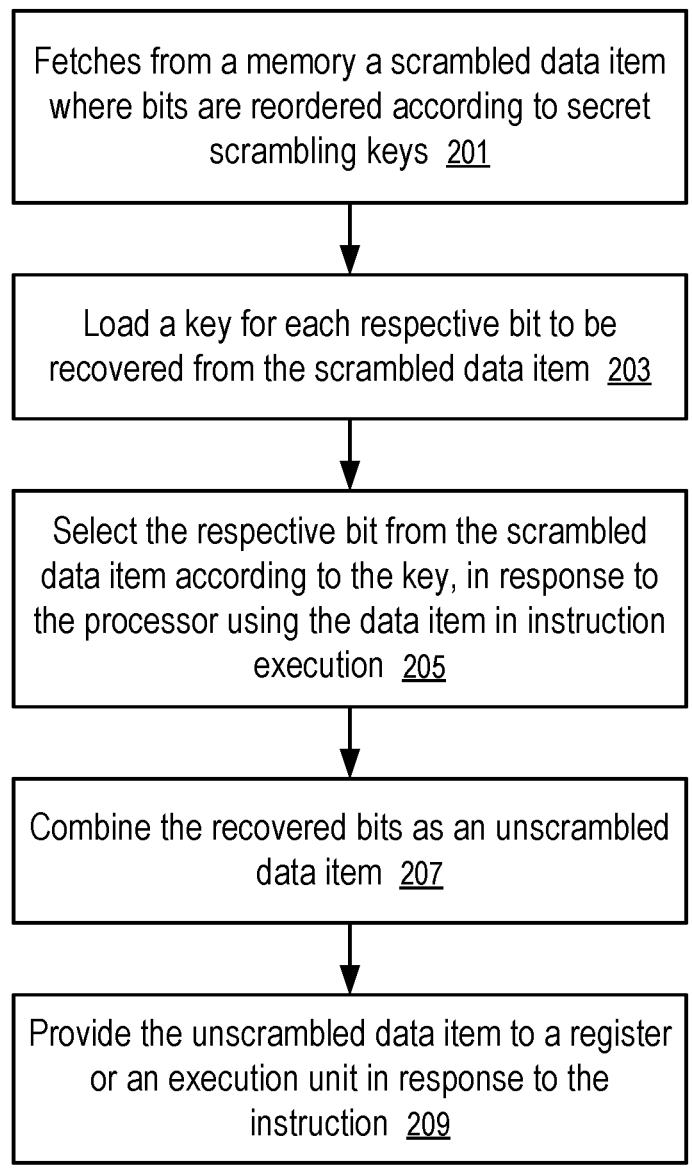
FIG. 4 shows a method to unscramble data in a processor according to one embodiment.

FIG. 4 shows a method to unscramble data in a processor according to one embodiment. For example, the method of FIG. 4 can be implemented in the computer system of FIG. 1 with an unscrambler (113) of FIG. 3.

At block 201, a processor (101) fetches from a memory (105) a scrambled data item (109), where bits are reordered according to secret scrambling keys. The scrambled data item (109) can be cached in a cache memory (e.g., 103 and/or 107).

For example, the processor (101) can be packaged in an integrated circuit chip with an internal cache (107), at least one register (111), and at least one execution unit (115). The memory (105) can be separate from and external to the integrated circuit chip. Optionally, an external cache (103) is coupled between the processor (101) and the memory (105). Data in the memory (105), the external cache (103), and the internal cache (107) can be in a scrambled form. For example, programs and/or their data can be stored in an encrypted form in the computer system; and in preparation for execution in the processor (101), a program and/or its data can be decrypted and stored in the memory (105) in a scrambled form. The processor (101) unscramble the program and/or its data inside the processor (101) in a secure zone; and programs and/or data of different users, different applications, and/or different virtual machines can be scrambled differently in the memory (105) for enhanced data security.

At block 203, an unscrambler (113) loads a key (e.g., 153) for each respective bit (e.g., 133) to be recovered from the scrambled data item (109).

At block 205, the unscrambler (113) selects the respective bit (e.g., 133) from the scrambled data item (109) according to the key (153), in response to the processor (101) using the data item in instruction execution.

Preferably, each unit of the scrambled data (109) and the corresponding unit of the unscrambled data (117) have a same number (n) of bits; and the register (111) has a width (n) that is equal to the number (n) of bits of each unit of scrambled data (109) or unscrambled data (117). The bit selection is performed with a unit for scrambling/unscrambling.

At block 207, the unscrambler (113) combines the recovered bits (131, ..., 133, ..., 135) as an unscrambled data item (117).

At block 209, the unscrambler (113) provides the unscrambled data item (117) to a register (111) or an execution unit (115) in response to the instruction execution.

For example, the unscrambled data item (117) can be an instruction to be executed, an address to be used by an instruction, or an operand to be operated upon during the execution of an instruction.

In some instances, the width of the scrambled data (109) and the width of the unscrambled data (117) are equal to the width of the register (111). In other instances, the width of the scrambled data (109) and the width of the unscrambled data (117) can be smaller than the width of the register (111). For example, a portion of a unit of data having the width equal to the width of the register (111) is scrambled; and the remaining portion of the unit is not scrambled. Unscrambling is performed for the scrambled portion that has a width smaller than the width of the register (111).

In some instances, the data is loaded into the register (111) in the scrambled form. When the data in the register (111) is to be used in the execution, the data is unscrambled for use by the execution unit (115). The register (111) can be a data register, an address register, or an instruction register. For example, the input of the unscrambler (113) is coupled to the output of the register (111) to receive the content in a scrambled form; and the output of the unscrambler (113) provides the content in an unscrambled form as input to the execution unit (115). Thus, the unscrambler (113) is positioned in the processor (101) on the data path between the register (111) and the execution unit (115).

Alternatively, the unscrambler (113) can be positioned in the processor (101) in the data path just before the register (111) such that when loading data from the cache (107) into the register (111), the data leaves the internal cache (107) in a scrambled form and enters the register (111) in an unscrambled form.

Alternatively, the unscrambler (113) can be positioned in the processor (101) in the data path from the internal cache (107) to the remaining part of the processor (101). Thus, the data leaves the internal cache (107) in a scrambled form for use during instruction execution in the remaining part of the processor (101) in an unscrambled form.

Figure 5:
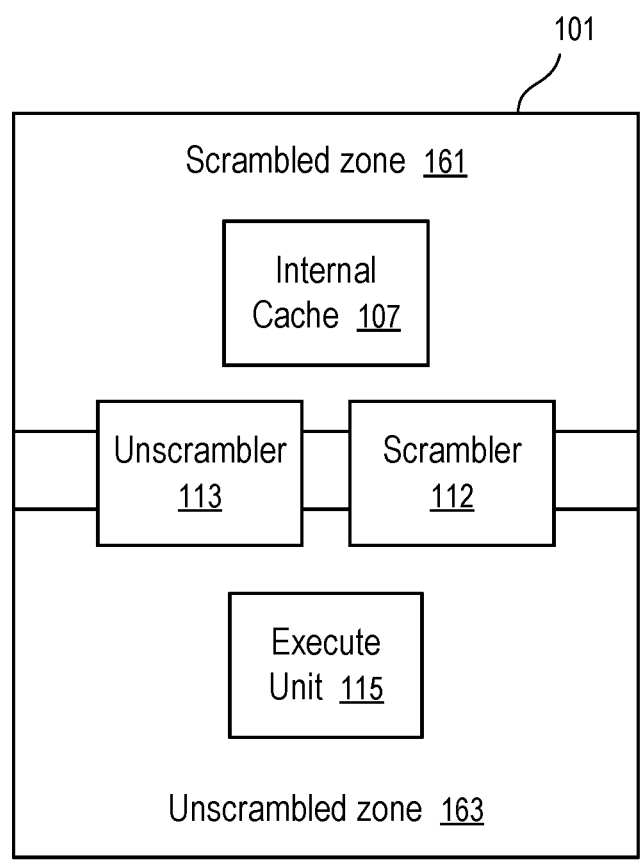
FIG. 5 shows a structure of a processor having different data security zones according to one embodiment.

FIG. 5 shows a structure of a processor (101) having different data security zones (161, 163) according to one embodiment.

The processor (101) can have a scrambled zone (161) and an unscrambled zone (163). The scrambled zone (161) includes the internal cache (107). The unscrambled zone (163) includes the execution unit (115). Thus, the execution unit (115) does not operate on any scrambled data (e.g., 109). The register (111) can be in the scrambled zone (161) or the unscrambled zone (163). An unscrambler (113) and a scrambler (112) interface or connect the scrambled zone (161) and the unscrambled zone (163). Content in the scrambled zone (161) is in a scrambled form; and content in the unscrambled zone (163) is in an unscrambled form. The processor (101) unscrambles content in the scrambled zone (161) to perform computation in the unscrambled zone (163) and scrambles the computation results before the computation results leave the unscrambled zone (163) and enter the scrambled zone (161). For example, in response to a load instruction, the unscrambler (113) converts scrambled data (109) into the unscrambled data (117) (e.g., for an arithmetic-logic unit of the processor (101)); and the unscrambler (113) does not use the arithmetic-logic unit for unscrambling operations. In response to a store instruction, the scrambler (112) converts a data item to be stored from an unscrambled form into a scrambled form. The scrambled result can be initially cached in the scrambled zone (161) and then stored in the external cache (103), the main memory (105), and/or a peripheral storage device in the scrambled form. Optionally, the unscrambler (113) and the scrambler (112) can share a portion of logic circuits (e.g., multipliers (141, ..., 143, ..., 145)). For example, the unscrambler (113) configured to load data from the scrambled zone (161) to the unscrambled zone (163) in response to load instructions can be reconfigured as a scrambler (112) by changing the keys (151, ..., 153, ..., 155) for scrambling output data going from the unscrambled zone (163) to the scrambled zone (161) in response to store instructions.

FIG. 1 illustrates the storing of data in a scrambled form in the main memory (105) and the cache memories (103 and 107) of a processor (101). Data can also be in the scrambled form in a storage device (e.g., a disk or a flash drive coupled to a peripheral bus of a computer system). Thus, when the data is loaded from the storage device into the main memory (105) and/or the cache memories (103 and 107), it is already in the scrambled form.

The use of the unscrambler (113) in the processor (101) limits the availability of clear, unscrambled content to only in a portion of the processor (101) and thus improves data security in the computer system.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computer system, comprising:
 a memory; and
 a processor coupled with the memory, the processor having:
   a cache;
   a register;
   an execution unit; and
   a first logic circuit configured to:
     convert scrambled data in the cache into unscrambled data in response to an instruction configured to load data from the memory into the register, wherein the data from the memory is in the cache as the scrambled data; and
     load the unscrambled data into the register in response to the instruction.

2. The computer system of claim 1, wherein the processor further comprises:
 a second logic circuit configured to convert an unscrambled result from the execution unit into a scrambled result for the cache, the memory, or a storage device.

3. The computer system of claim 2, wherein the processor is configured within an integrated circuit chip; and the memory is configured outside of the integrated circuit chip.

4. The computer system of claim 3, further comprising:
 an external cache coupled between the memory and the processor and configured outside of the integrated circuit chip.

5. The computer system of claim 4, further comprising:
 a second processor coupled to the memory or the external cache;
 wherein the second processor is configured without access to a key to convert the scrambled data into the unscrambled data.

6. The computer system of claim 2, wherein the scrambled data and the unscrambled data have a same number of bits; and the register has a width that is equal to the number of bits.

7. The computer system of claim 6, wherein the unscrambled data includes an instruction, an address, or an operand of an instruction.

8. The computer system of claim 7, wherein the first logic circuit is configured to convert, in response to an execution of an instruction in the execution unit configured to use a content of the register during the execution, the scrambled data in the register into the unscrambled data as an input to the execution unit.

9. The computer system of claim 7, wherein the first logic circuit is configured to convert, in response to a request to load a content into the register, the scrambled data into the unscrambled data as an input to the register.

10. The computer system of claim 6, wherein the first logic circuit includes a plurality of multiplexers, each respective multiplexer in the plurality of multiplexers configured to select one bit from the scrambled data according to a key as a corresponding bit of the unscrambled data.

11. The computer system of claim 2, wherein the scrambled data and the unscrambled data have a same set of bits with different orders.

12. A method, comprising:
 receiving, in a processor from a memory located outside of the processor, scrambled data;
 storing into a cache of the processor, the scrambled data; and
 converting, by a logic circuit of the processor in response to a request to use the scrambled data in a register of the processor or an execution unit of the processor, the scrambled data in the cache into unscrambled data as an input to the register or the execution unit.

13. The method of claim 12, further comprising:
 converting, by the logic circuit of the processor in response to a request to output from the execution unit into the cache, the memory, or a storage device, an unscrambled result from the execution unit into a scrambled result for the cache, the memory, or the storage device.

14. The method of claim 12, further comprising:
 selecting, by a plurality of multiplexers of the logic circuit, bits from the scrambled data as bits of the unscrambled data according to a key.

15. The method of claim 14, wherein the scrambled data and the unscrambled data have a same number of bits; and the register has a width that is equal to the number of bits.

16. The method of claim 14, wherein the scrambled data and the unscrambled data have a same set of bits with different orders.

17. The method of claim 16, wherein the unscrambled data includes an instruction, an address, or an operand of an instruction.

18. A processor, comprising:
 an integrated circuit chip, having:
   a cache;
   a register;
   an execution unit; and
   a logic circuit configured to:
     convert scrambled data in the cache into unscrambled data in response to execution of an instruction; and
     load the unscrambled data in response to the execution of the instruction into the register or the execution unit.

19. The processor of claim 18, wherein the logic circuit is further configured to convert an unscrambled result from the execution unit into a scrambled result for the cache, a memory located outside of the integrated circuit chip, or a storage device.

20. The processor of claim 19, wherein the logic circuit comprises a plurality of a plurality of multiplexers, each respective multiplexer in the plurality of multiplexers configured to select one bit from the scrambled data according to a key as a corresponding bit of the unscrambled data.

* * * * *